J. L. CREVELING.
ELECTRIC REGULATION.
APPLICATION FILED JULY 27, 1910.
1,010,025.
Patented Nov. 28, 1911.
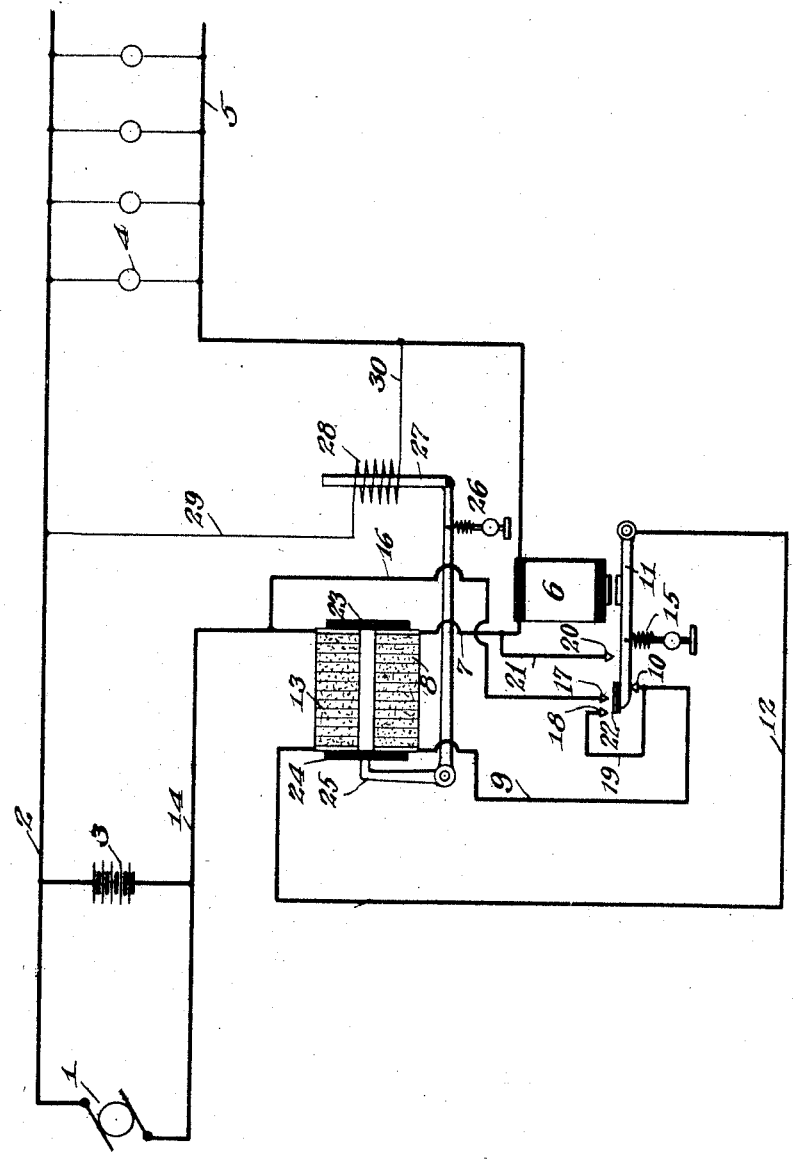
WITNESSES
INVENTOR
John L. Creveling

UNITED STATES PATENT OFFICE.

JOHN L. CREVELING, OF NEW YORK, N. Y., ASSIGNOR TO SAFETY CAR HEATING AND LIGHTING COMPANY, A CORPORATION OF NEW JERSEY.

ELECTRIC REGULATION.

1,010,025.   Specification of Letters Patent.   Patented Nov. 28, 1911.

Application filed July 27, 1910. Serial No. 574,040.

*To all whom it may concern:*

Be it known that I, JOHN L. CREVELING, a resident of New York, in the county and State of New York, have invented certain new and useful Improvements in Electric Regulation, as set forth in the annexed specification and drawing, forming a part thereof.

My invention pertains to that class of electric regulation in which it is desired to automatically hold the voltage upon, or the current in, a circuit substantially constant throughout wide ranges in change of voltage at the source feeding said circuit and throughout wide changes in load upon said circuit.

My invention has for its particular object to provide a means of regulation as above set forth which shall be automatic, simple and durable and have a wide range of action.

As my invention is particularly applicable to systems of electric distribution wherein a generator is used to charge a storage battery and supply lamps or other translating devices, it will be described in connection with such a system.

The drawing is a diagrammatic representation of a system of electric distribution embodying my invention.

In the drawing 1 represents any suitable type of dynamo or generator from the positive brush of which the lead 2 is carried to one side of the storage battery 3 and one side of the lamps or translating devices 4. The other side of the lamps or translating devices is connected as by the main 5 to one side of the windings of electromagnet 6, the other side of which is connected as by wire 7 to one end of the carbon pile 8. The opposite end of the carbon pile 8 is connected as by wire 9 with switch contact 10 adapted to make contact with the armature 11 electrically connected as by wire 12 with one end of the carbon pile 13, the other end of which is connected as by lead 14 with the negative side of the storage battery 3 and the negative pole of the generator 1. The adjustable spring 15 tends to hold the armature 11 away from the magnet 6 and in contact with the contact member 10. The wire 16 is carried from the lead 14 to contact member 17. The adjacent contact member 18 is connected as by wire 19 with the contact member 10. The wire 7 is connected with the contact 20 as by wire 21. The armature 11 is provided with the contact member 22 insulated therefrom as shown and adapted, when 11 is raised by the action of magnet 6, to cause electrical communication between contacts 17 and 18 at the same time that the lever 11 makes contact with 20. The carbon piles 8 and 13 are held at one end against a stationary insulating member 23 and at the other end they have in contact therewith the movable insulating member 24 connected with the bell-crank lever 25 normally drawn in a downward direction by the adjustable spring 26 which tends to increase the pressure upon the said carbon piles in such manner as to reduce the resistance thereof.

27 is a movable core of magnetic material carried by the lever 25 and surrounded by a coil 28 in shunt across the translation circuit as by wires 29 and 30.

The operation of this system embodying my invention is substantially as follows starting with the generator supplying current to the battery and to the lamps or translating devices which we will consider at first as few in number and constituting a light load: Under these conditions current will flow from the generator through lead 2 to the storage battery 3 and one side of the translating devices 4, thence through main 5 to magnet 6. From the opposite side of 6 current will flow through 7 to one side of the carbon pile 8, through the pile 8 to wire 9 and thence to the contact member 10 and from 10 through lever 11 and wire 12 to one side of the carbon pile 13 and from the other side of the said pile through lead 14 to the negative side of the storage battery 3 and generator 1. Current will also flow from the translation circuit through the coil 28 as by means of wires 29 and 30 and tend to lift the core 27 against the action of spring 26 so as to increase the resistance of the carbon piles 8 and 13 in series with the lamps or translating devices. Therefore, if the spring 26 be properly adjusted, the action of coil 28 will cause the resistance to be increased when the voltage across the translation circuit shall reach its normal value and prevent any further rise therein and thus hold the voltage upon the translating devices practically constant throughout rise in voltage across the generator circuit as will take place, for example, when the batteries are approaching their fully charged state.

Throughout the above outlined operation, with a light lamp load, the carbon piles 8 and 13 were in series and in this way enabled the coil 28 to insert the maximum resistance in circuit if necessary so as to cause sufficient drop in case of very light load on the translation circuit. I adjust the spring 15 so that when the lamp load exceeds a certain value, at which value it is desired that the carrying capacity of the carbon resistance shall be increased, and it is also permissible that its ohmic resistance may be decreased and still produce the desired drop on the line in a well known manner, then the magnet 6 will attract the armature 11 and break the contact at 10 and instantly close the contact between 17 and 18 as by means of member 22 and cause communication between the lever 11 and the contact 20. Under these conditions the current will flow from the generator through lead 2 to one side of the storage battery 3 and to the lamps or translating devices 4 and return through 5 to the magnet 6, to wire 7 where it will divide, part returning through wire 7, carbon pile 8, wire 9, wire 19, contacts 18, 22 and 17, wire 16 and lead 14 to one side of the storage battery 3 and generator 1 and part through wire 21, contact 20, lever 11, wire 12, carbon pile 13 and lead 14 to the battery 3 and generator 1. Thus it will be seen that the two carbon piles 8 and 13 are in multiple and that the carrying capacity of the rheostat, as a whole, is substantially double what it was when they were operating in series. However, the range of resistance increasing capacity is now only about one half what it was before but this range may be lowered as the load is increased as the drop across the resistance is a function of the load as well as the ohmic resistance of the carbon piles themselves. If now the lamp load be sufficiently diminished the reverse operation will take place and the carbon piles 8 and 13 will again be placed in series with each other.

It will be obvious that I may use any number of carbon piles as indicated at 8 and 13 or that I may subdivide one pile into many series without departing from the spirit of my present invention. Two piles only are shown in the drawing for sake of simplicity.

It will be obvious that wide departure may be made in the matter of design and construction without departing from the spirit of my invention which is shown in the drawing in diagrammatic form only for the purpose of illustration.

Having thus described my invention that which I consider as novel and desire to cover by Letters Patent is as set forth in the following claims:

1. A regulator for an electric circuit comprehending a plurality of regulating units responsive to voltage fluctuations and means for varying the mutual relation of said units depending upon the load upon said circuit.

2. Means for regulating an electric circuit comprehending a plurality of regulating units in operative relation to said circuit, automatic means for operating said units and means for altering the mutual relations of said plurality of regulating units depending upon conditions in the circuit to be regulated.

3. Means for regulating an electric circuit comprehending a plurality of resistors in operative relation thereto, means for operating said resistors responsive to variations in said circuit and automatic means for varying the mutual relation of said resistors depending upon the current in said circuit.

4. Means for regulating an electric circuit comprehending a plurality of resistors, automatic means for governing the resistance thereof and automatic means for altering the mutual relation of said resistors depending upon the current in said circuit.

5. Means for regulating an electric circuit comprehending a plurality of circuit controlling means, means for operating the same and automatic means responsive to fluctuations in said circuit for connecting said circuit regulating means in series and in multiple with each other.

6. Means for regulating an electric circuit comprehending a plurality of carbon pile resistances in operative relation to said circuit, automatic means for varying the resistance of said piles and automatic means responsive to the conditions in said circuit for governing the mutual relationship of said carbon piles.

7. Means for governing an electric circuit comprehending a plurality of circuit controlling means, a common means for operating said controlling means and automatic means depending upon circuit conditions for governing the mutual relationship of said controlling means.

8. Means for regulating an electric circuit comprehending a plurality of units jointly affecting said circuit, means for controlling the joint effect of said units and automatic means for varying the mutual relationship of said units.

9. Means for regulating an electric circuit comprehending a plurality of units jointly affecting said circuit, means for controlling the joint effect of said units and automatic means affected by load changes upon said circuit for varying the mutual relationship of said units.

10. Means for regulating an electric circuit comprehending a plurality of units jointly affecting said circuit, means responsive to voltage fluctuations across said circuit for operating the same, means for controlling the joint effect of said units and automatic means affected by load changes upon said circuit for varying the mutual relationship of said units.

11. Means for regulating an electric circuit comprehending a plurality of units jointly affecting said circuit, a coil responsive to fluctuations in said circuit for operating said units and means responsive to the current in said circuit for altering the mutual relations of said units.

12. Means for regulating an electric circuit comprehending a plurality of regulating units in said circuit, a coil in shunt across said circuit for operating said units and a coil in series with said circuit for altering the mutual relationship of said units.

13. The combination with a feeding circuit and a work circuit, of a regulator for the work circuit comprehending a plurality of regulating units jointly affecting said circuit, means for affecting said units responsive to voltage fluctuations across said circuit and means for controlling the mutual relationship of said units responsive to current fluctuations in said circuit.

JOHN L. CREVELING.

Witnesses:
M. HILLOCK,
E. HALL.

---

Copies of this patent may be obtained for five cents each, by addressing the "Commissioner of Patents, Washington, D. C."